April 12, 1927.
H. FOERSTERLING
METHOD OF MAKING AIR GAS
Filed March 28, 1925
1,624,046
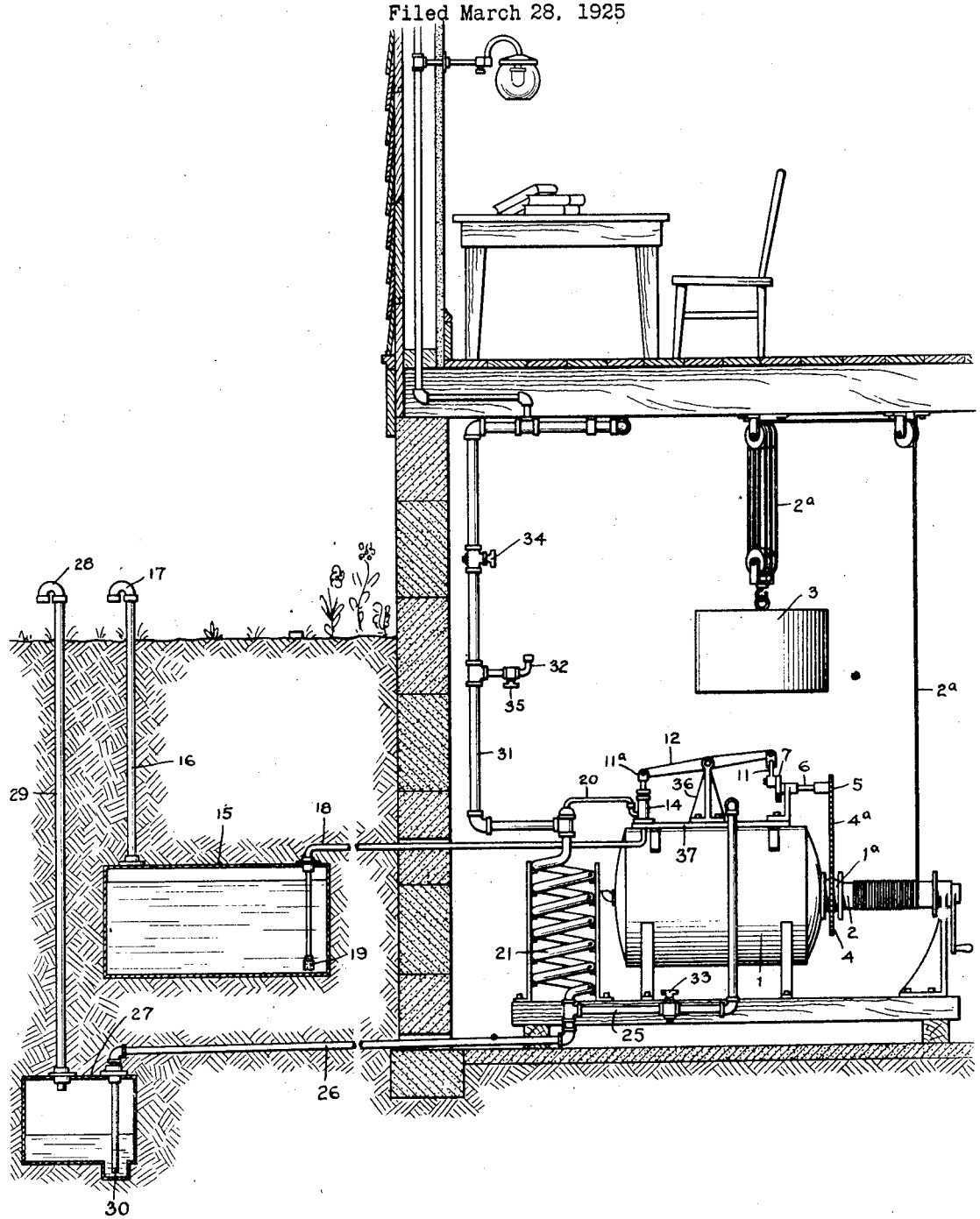
INVENTOR,
Hans Foersterling,
BY
Henry J. Luake,
ATTORNEY.

Patented Apr. 12, 1927.

1,624,046

UNITED STATES PATENT OFFICE.

HANS FOERSTERLING, OF JAMESBURG, NEW JERSEY.

METHOD OF MAKING AIR GAS.

Application filed March 28, 1925. Serial No. 19,167.

The invention relates to an improved method of making air gas.

In my copending application Serial No. 13,068, entitled Method of making air gas, filed by me on the 5th day of March, 1925, I have described a method of making air gas by vaporizing with air volatile inflammable liquids, which either have sufficient or partially sufficient vapor tension to form with air at atmospheric temperatures an ignitable air gas which will burn homogeneously. I have also described a suitable apparatus for carrying out this method, which apparatus is set forth and claimed in my U. S. Patent No. 1,601,303, dated September 28th, 1926.

In my copending application Serial No. 13,069, entitled Method of producing air gas, filed by me March 5th, 1925, I have described a method of making air gas by vaporizing with air volatile inflammable liquids, which either have sufficient or partially sufficient vapor tension to form with air at atmospheric temperatures an ignitable air gas, which will burn heterogeneously.

This application refers to a method of making air gas also from such volatile inflammable liquids which do not possess sufficient vapor tension to form with air at atmospheric temperatures an ignitable air gas and sets forth in detail how from such liquids an air gas can be produced which will burn either homogeneously or heterogeneously.

My invention will be more fully understood from the consideration of certain physical and chemical properties of air gas producing compounds of liquid form, which properties play an important role in my invention.

By dividing the molecular weight of a compound by the factor 28.94, which represents the assumed molecular weight of the air, I calculate its vapor density, which may be designated $a$.

Hence one liter vapor of any particular compound will weigh at 10° C. 1.248 grams times $a$.

By dividing the vapor tension of such compound at 10° C. by 760, I obtain the volume per cent of the vapor in air, which I call $b$.

Hence $a$ times $b$ times 1.248 times 10 gives the number of grams of such compound which can be vaporized theoretically at 10° C. per one cubic meter.

The following table is compiled on basis of this calculation, the following vapor tension figures being given in millimeters and refer to 10° C., being taken from Landolt-Bornstein, Physikalisch-Chemische Tabellen, Verlag von Julius Springer, Berlin, 1905.

| Formula. | Molec. weight. | Vapor density. | Vapor tension. | Volume % | Grams per one cubic meter of gas. | Vol. % air. |
|---|---|---|---|---|---|---|
| Methyl-alcohol $CH_3OH$ | 32 | 1.105 | 53.8 | 7.08 | 97.5 | 92.92 |
| Ethyl-alcohol $C_2H_5OH$ | 46 | 1.59 | 24.08 | 3.17 | 62.8 | 96.83 |
| Ether $(C_2H_5)_2O$ | 74 | 2.55 | 286.8 | 37.7 | 1200 | 62.3 |
| Acetone $CH_3COCH_3$ | 58 | 2.02 | 90 | 11.85 | 296 | 88.15 |
| Benzol $C_6H_6$ | 78 | 2.69 | 45.25 | 5.96 | 200 | 94.04 |

Complete combustion is governed by the following weight equations:

$$CH_3OH + 3O = CO_2 + 2H_2O \quad (a)$$
$$C_2H_5OH + 6O = 2CO_2 + 3H_2O \quad (b)$$
$$(C_2H_5)_2O + 12O = 4CO_2 + 5H_2O \quad (c)$$
$$CH_3COCH_3 + 8O = 3CO_2 + 3H_2O \quad (d)$$
$$C_6H_6 + 15O = 6CO_2 + 3H_2O \quad (e)$$

from which can be calculated that:

$a$. 1000 liters gas containing 97.5 grams methyl alcohol in vapor form=70.8 liters will require for complete combustion 109.5 grams O; the remaining 929.2 liters air contain at 10° C. (assuming 20.9 volume % O at 1.38 grams) 267.5 grams O or 158 grams O are in excess.

$b$. 1000 liters gas containing 62.8 grams ethyl alcohol in vapor form=31.7 liters will require 172 grams O, while the remaining 968.3 liters of air contain 279 grams O or 107 grams O are in excess.

$c$. 1000 liters of gas containing 1200 grams ether in vapor form=377 liters will require 3135 grams O, while the remaining 623 liters of air contain only 179.5 grams O or 2995.5 grams O are lacking.

$d$. 1000 liters of gas containing 296 grams acetone in vapor form=118.5 liters will require 654 grams O, while the remaining 881.5 liters of air contain only 253 grams O or 401 grams O are lacking.

$e$. 1000 liters of gas containing 200 grams benzol in vapor form=59.6 liters will require 616 grams O, while the remaining 940.5 liters of air contain only 270 grams O or 346 grams O are lacking.

It will be obvious from these calculations why an air gas made by vaporizing methyl-alcohol or ethyl alcohol with air at 10° C., will not burn, whereas an air-ether, air-acetone or air-benzol gas will burn.

Of the latter three, the air-acetone and air-benzol mixtures are of special interest.

5 According to the equation:

$$CH_3COCH_3 + 8O = CO_2 + 3H_2O$$

58 grams acetone require 128 grams oxygen which are contained in 443 liters of air at 10° C. As 1 liter of acetone vapor weighs 2.5 grams hence 58 grams acetone correspond to 23.2 liters of vapor; or a mixture of

```
  443 liters of air containing 128 grams O
 23.2 liters acetone vapor=58 grams acetone
 ─────
 466.2 liters
``` contain air and acetone in the proportion necessary for complete combustion. Such a gas corresponds to 4.97 vol % or a vapor tension of 37.8 mm.

I have not been able to find a table recording the vapor tension of acetone below 20° C., at which temperature it amounts to 179.6 mm. Plotting however a curve from the published data of higher temperatures I derive the vapor tension of 90 mm. for 10° C., which figure 1 have assumed in my calculations as approximately correct. It will be obvious that an air-acetone mixture having a vapor tension of only 37.8 mm. can be exposed to a temperature below 0° C. without condensing any acetone vapor. The same mixture corresponds to 3.7 grams acetone or 4.6 cc. per 28.3 liters of air.

I will now describe one method of carrying out my invention using acetone as the raw material for the production of air gas and by means of a suitable apparatus, the features of which will be more fully understood from the following detail description and the accompanying drawings, in which the figure is a view, largely in vertical section and partly in side elevation, of one form of apparatus in which my invention may be carried out.

Referring to the figure, 1 represents a fan or blower as is commonly used in the manufacture of air gas; the fan or blower 1 is provided at its back with an air intake (not shown) and at its front with an axle, connected by suitable means such as the winch 2 actuated by the counterweight 3 by means of the wire rope 2ª wound on the winch 2. On the shaft 1ª of the internal wheel of the fan or blower, I mount the sprocket wheel 4 which drives by means of a chain 4ª the sprocket wheel 5 keyed to or otherwise fixed on one end of the countershaft 6. At the other end of the countershaft 6 is secured the eccentric or cam 7. The hub of the eccentric 7 is regulated by any suitable means, thereby controlling the proportion of the air to the acetone to be vaporized, as appears more fully hereinafter. The eccentric 7 drives by means of the lever 11, the rock shaft 12 and lever 11ª the piston (not shown) of the pump 14. 15 represents a storage tank for the inflammable liquid, located preferably underground. The tank 15 is provided with a breather pipe 16 which serves at the same time as its filling means upon unscrewing the bend 17. The tank 15 is connected with the pump 14 by means of the pipe line 18, which is provided at its end within the tank 15 with the foot valve 19.

The overflow 20 of the pump 14, see Fig. 1, is connected with the coil 21. The lower end of coil 21 is connected by means of the air line 25 with the outlet of the fan or blower 1. By means of the pipe line 26 the bottom of the coil 21 is connected with the overflow tank 27. The tank 27 collects any moisture and other impurities of the acetone, and similarly for other volatile inflammable liquids pursuant to my invention; the tank 27 is emptied as required by unscrewing the bend 28 from its breather pipe 29, to permit a pump to be inserted through the pipe 29 and into the tank. The pipe line 26 is sealed within the tank 27 against the flow of the gas by means of its seal 30. The gas main 31 is connected to the upper end of the coil 21 as shown and is provided with a test burner 32.

The cock 33 controls the air line 25 leading to the coil 21. The cock 34 controls the main gas line 31 and the cock 35 controls the test burner 32.

The casing of the blower or fan 1 is filled with a suitable sealing fluid to the desired height. The storage tank 15 is filled with acetone and enough water is put in the residue tank 27 to cover its seal 30. The cocks 33, 34 and 35 are now closed. The counterweight 3 is then wound up manually or otherwise. The cock 35 of the test burner 32 is now opened. The blower or fan 1 is set into motion and at the same time the pump 14 through the gearing, including the sprocket wheels 4 and 5, pumps acetone from the tank 15 into the coil 21.

Upon regulating the pump so that approximately 5.6 ccm. of acetone per 28.3 liters of air are passed through the coil 21, I obtain a gas which burns with a green inner core, surrounded by a blue outer mantle. The acetone is thereby completely vaporized with the exception of moisture and other impurities contained therein.

Using the same grade of acetone and passing it through the aforesaid apparatus above referred to, but burning the mixture of air and acetone vapor so produced under conditions suitable for heterogeneous combustion as described in my aforesaid copending application, Serial No. 13,069, and using the burner described pursuant to my method set forth in my copending application Serial No. 57,996, filed by me on the 23rd day of September, 1925, and entitled Method of heating, I have discovered that I require only 3.7 ccm. of acetone per 28.3 liters of air.

The theoretical calculation for benzol gives the following data:

According to the equation:

$$C_6H_6 + 15O = 6CO_2 + 3H_2O$$

78 grams benzol require 240 grams O or 832 liters of air. One liter of benzol vapor weighs 3.36 grams, hence the 78 grams benzol correspond to 23.2 liters of benzol or a mixture of

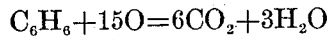

832 liters of air containing 240 grams oxygen
23.2 liters of benzol vapor containing 78 grams benzol
─────────────
855.2 liters constitute the proper proportions. Such a gas corresponds to 2.71 vol. % or a vapor tension of 20.6 mm. As the vapor tension of benzol as 0° C. has been determined at 26.54 mm., it is clear that the above air-benzol gas mixture may also be exposed to a freezing temperature without risk of any condensation in the pipe lines.

78 grams benzol per 832 liters of air correspond to 2.65 grams which is the equivalent of 3 ccm. per 28.3 liters of air.

Using a pure benzol having a sp. gr. of .887 at 9.5° C. and duplicating the experiments described above for an air-acetone gas I find that I use under the conditions suitable for homogeneous flame combustion 3.5 ccm. and for heterogeneous surface combustion 2.3 ccm. per 28.3 liters of air.

Using a 90% benzol I required 3.1 ccm. for homogeneous flame combustion and 2.5 ccm. for heterogeneous surface combustion.

In all four tests the benzol was completely vaporized.

It will be obvious from the above that inflammable liquids other than acetone or benzol may be used in connection with the aforesaid method and my aforesaid apparatus described in my aforesaid copending application, Serial No. 13,068 and that they shall serve only as an example for demonstrating the requisites which have to be complied to.

90% benzol is sold today at 23 cts. per gal. against about 20 cts. for motor gasoline; hence its price is not excessive for heating and illuminating purposes in connection with my aforesaid apparatus.

Benzol being completely vaporized, and cheaper than the so-called gas machine gasoline, and also at much less risk in handling and storing, from the explosion standpoint, than gasoline, it is especially adapted for the houshold which has no use for the unvaporized residue of motor gasoline for power purposes.

Benzol is a by-product of tar distillation and of coking processes and is produced in increasing quantities.

Acetone is obtained by dry distillation of acetate of lime, and also as a by-product of wood distillation. It can also be obtained by fermentation of starch containing material for instance such as maize. While the price of acetone, (fermentation acetone being quoted today at 10 cts. per lb.) seems to be high, it is in so far of interest that it can be produced from plant matter and may be for that reason of more importance in the future.

For the reasons previously stated it has always been considered impossible to use the lower alcohols, especially ethyl alcohol, for the purpose of producing an air gas. Artificial heat would not help any, since the low vapor tension these substances possess would tend towards condensation in the pipe lines. I have found however that I can also use these lower alcohols for the production of air gas by mixing them with other volatile inflammable liquids, if I follow certain considerations which I describe in the following.

I have shown that a gas mixture containing 70.8 liters of methyl alcohol vapor = 97.5 grams methyl alcohol and 929.2 liters of air has 158 grams O in excess over what is required for the complete combustion of the alcohol.

I have also shown that a gas mixture containing 118.5 liters of acetone vapor = 296 grams of acetone and 881.5 liters of air is lacking 401 grams O for the complete combustion of its acetone content.

By adding to the air vapor mixture showing a deficit of oxygen sufficient of an air vapor mixture possessing a surplus of oxygen, or vice versa, I derive a balanced air-inflammable liquid vapor mixture, in which both liquid constituents will be completely vaporized and burned, when the gas is ignited.

For instance, to ascertain the proportion of methyl alcohol to acetone, to provide for the consumption of the maximum quantity of methyl alcohol, the quantities required per 1000 liters of air at 100° C. are computed from the following factors:—

1000 liters of gas contains 97.5 grams of methyl alcohol with 158 grams of oxygen in excess. Further since 1000 liters of gas contain 296 grams of acetone with 401 grams of oxygen deficit, it follows that 394 liters of gas contain 116.5 grams of acetone with 158 grams of oxygen deficit.

Therefore I will obtain a balanced air gas which will vaporize completely at 10° C., by mixing 97.5 grams methyl alcohol with 116.5 grams acetone and pass this mixture through my apparatus as hereinabove described.

1000 liters of gas containing 97.5 grams $CH_4O = 7.08$ vol. % and 929.2 liters of air and 394 liters of gas containing 116.5 grams $C_3H_6O = 11.85$ vol. % and 347.4 liters of air make a total of 1394 liters of gas, containing a total of 1276.6 liters of air.

Hence, to completely vaporize 97.5 grams of methyl alcohol, I add 116.5 grams of acetone, and 1276.6 liters of air are employed to thus vaporize such mixture of methyl alcohol and acetone to yield an air gas which is completely burned without any further addition of any combustion supporting gas. This is an equivalent of 2.15 grams of methyl alcohol and 2.58 grams of acetone per 28.3 liters of air, or 2.61 ccm. of methyl alcohol and 2.58 ccm. of acetone, i. e., a total of 5.19 ccm. of the methyl alcohol-acetone mixture per 28.3 liters of air.

Based on the same considerations I have calculated that 1000 liters containing 62.8 grams ethyl alcohol with 107 grams O in excess and 268 liters containing 79.5 grams acetone with 107 grams O deficit will furnish a balanced gas.

Since such a mixture contains 1204.3 liters of air, I use 1.475 grams ethyl alcohol +1.866 grams acetone. That is to say, 1.83 ccm.+2.3 ccm. or a total of 4.13 ccm. of this mixture per 28.3 liters of air.

I have prepared a mixture of methyl alcohol and acetone as above calculated, using a 95% methyl alcohol of a sp. gr. of .83 and a technical acetone testing .82 sp. gr. at 0° C. and ran the same through my aforesaid apparatus and obtained an air gas which burns with a good flame, showing a green inner core surrounded by a blue mantle. I also found that the mixture was completely vaporized. Using the heterogeneous surface combustion burner previously referred to, I found that I consumed 5 ccm. of this mixture per 28.3 liters of air against the theoretically calculated amount of 5.79 ccm. showing that I can use a lean gas which corresponds with former experience.

A mixture of methyl alcohol+acetone is in so far of special interest as both form by-products of the wood distillation process and the proportion of methyl alcohol to acetone, which can be obtained from a given amount of hardwood is substantially the same as the one stated above.

When employing methyl alcohol and acetone as the liquids to be vaporized, I can either employ separate reservoirs and pumps for the respective liquids, each pump being connected to the vaporizer of my aforesaid apparatus, said pumps being controlled by individual cams, or I can mix the liquids in the desired proportion and proceed according to the method and apparatus described and claimed in my co-pending applications Serial No. 13,068 and Serial No. 61,816, respectively.

It is obvious that for my purpose it is not necessary to have pure products. Some of the chief ingredients in the raw wood alcohol besides methyl alcohol are acetone and methyl acetate, and also aldehydes. The important data for acetone have already been given. Methyl acetate has the formula $C_2H_3O_2CH_3$; its molecular weight is 74, and its vapor density is 2.55. Its vapor tension amounts to 62.1 mm. at 0° C. and 104.85 mm. at 10° C. Hence at 0° C. 8.18 vol. % and at 10° C. 13.8 vol. % are taken up. For complete combustion 7 molecules O are required per one molecule methyl acetate. From this data and the previous given data for acetone it will be seen that the principal impurities of raw wood alcohol are desirable as far as its use for the production of air gas is concerned and that it is preferable to leave these impurities in and merely concentrate the raw wood alcohol by simple redistillation.

As today's cost of methyl alcohol is largely so high on account of the cost of purification, which is an expensive process, it is obvious that such an impure product as is desirable for my process can be produced at a considerably lower figure.

Mixtures of methyl alcohol and acetone have also been produced simultaneously by the dry distillation of black liquor resulting from the soda pulp industry.

What I have said in regard to the requirements of a methyl alcohol for the purpose of producing an air gas prevails also for acetone. It is obvious that an acetone for acetone. It is obvious that an acetone suitable for use in the manufacture of air gas does not have to possess a like purity as one which is used in the manufacture of powder or for extraction purposes.

I have further prepared a mixture of ethyl alcohol and acetone in conformity to the previously referred to theoretical calculation, using a denatured alcohol as sold for preventing automobile radiators from freezing in winter time and which tested .835 sp. gr. at 0° C., indicating a product of approximately 90% purity.

I found, using a burner suitable for heterogeneous surface combustion, that I consumed 5.1 ccm. of such mixture per 28.3 liters of air against 4.13 ccm. as calculated. The higher actual consumption is partly due to the impurities contained in the denatured alcohol and partly due to the insufficient size of the vaporizer used, which is proven by the fact that approximately 10% of the mixture was recovered in the overflow.

It is obvious that with a liquid of such low vapor tension as ethyl alcohol possess at the temperatures which come under consideration for my process, the success of it depends on the time allowed for reaching the saturation maximum for a given temperature.

This was further illustrated by an experiment carried out in which the same mixture was burned under conditions favorable for homogeneous flame combustion, where a greater amount of liquid was sent through the apparatus in the same time period. In this instance I used 6.35 ccm. of the mixture per 28.3 liters of air and the unvaporized portion increased to 23.7%.

Still more pronounced was this factor when I prepared a balanced mixture of ethyl alcohol and ether. Here extremes meet, a compound of enormous vapor tension is combined with one possessing a very low one; 28.3 liters of air at 10° C. takes up 54.6 grams ether but only 1.82 grams ethyl alcohol.

Passing such a mixture containing 212 ccm. of common denatured alcohol and 162 ccm. of ether through my apparatus, I used 6.4 ccm. per 28.3 liters of air against 3.7 ccm. which I should use theoretically. From the amount of recovered liquid I calculated that only approximately 27% of the alcohol passed through my apparatus was vaporized.

But to those skilled in the art it will be clear that even such a mixture can be used in connection with my process, provided the vaporizer is so constructed as to afford a greater extent of counterflow and thereby provide sufficient additional time for attaining complete saturation of the air with the vapor of the liquid having a low vapor tension.

In view of the fact that ethyl alcohol can be manufactured from plant matter at a low price practically everywhere, that our resources of gasoline are declining and that the transportation of gasoline to countries possessing no oil deposits increases its cost, the possibility of its use for the purpose of producing an air gas seems to be very important.

In countries where hydrocarbons such as gasoline or benzol are not produced today, as for instance in the tropics, which on the other hand possess an abundance of raw material for the manufacture of alcohol, ether, acetone, and the like, mixtures of such compound seem to be destined to solve the problem of an economic heating method for household purposes.

It must be clearly understood that the compounds mentioned, the mixtures enumerated shall serve only the purpose of illustrating my invention and that other volatile inflammable liquids filling the requirements stated can be used, the mixtures of the compounds mentioned can be changed in innumerable ways, other mixtures may be compounded.

Whereas, I have described my invention by reference to specific forms thereof, it will be understood that many changes and modifications may be made without departing from the spirit of the invention; in certain of the appended claims wherein by reason of the objection to the use of alternative expression in the claims methyl alcohol is mentioned it is to be understood that such expression is not to be regarded as limiting such claims specifically to said alcohol. Any other inflammable liquid which is volatile and does not possess sufficient vapor tension under conditions of normal temperature to form an explosive gas mixture is to all intents and purposes an equivalent to methyl alcohol. The term of methyl alcohol is hence to be regarded of sufficient breadth to cover such equivalents and is employed in this fashion to avoid alternativeness in said claims.

In certain of the appended claims wherein by reason of the objection of alternativeness, I have used the expression "the total amount of oxygen contained in the final air inflammable vapor mixture shall not be greater than required by the combustible constituents for complete combustion" it must be likewise understood to include also such a composition wherein a slight excess of oxygen is present and which is suitable for heterogeneous combustion as described in my copending application Serial No. 13,069. Hence the above expression includes such equivalent of composition and is employed solely to avoid alternativeness in said claims.

I claim:

1. The method of making an air gas from an inflammable volatile liquid possessing a vapor tension insufficient to form with air at atmospheric temperatures and low pressure an ignitable gas, which comprises mixing such volatile inflammable liquid with another volatile inflammable liquid possessing a vapor tension sufficient to form with air an ignitable gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture with air at atmospheric temperatures and low pressure, and regulating the amount of air accordingly.

2. The method of making an air gas from an inflammable volatile liquid possessing a vapor tension insufficient to form with air at atmospheric temperatures and low pressure an ignitable gas, which comprises mixing such volatile inflammable liquid with another volatile inflammable liquid possessing a vapor tension sufficient to form with air an ignitable gas containing a deficit in oxygen content for complete combustion in such proportion that the total amount of oxygen contained in the air gas resulting from such mixture is substantially that required for the complete combustion of the combustible constituents of such liquid mixture, vaporizing such liquid mixture with air at atmospheric temperatures and low pressure, regulating the amount of air accordingly, and maintaining such proportion of the air and such liquid mixture independently of the rate of consumption of the resulting air gas.

3. The method of making an air gas from an inflammable volatile liquid possessing a vapor tension insufficient to form with air at atmospheric temperatures and low pressure an ignitable gas, which comprises mixing such volatile inflammable liquid with another volatile inflammable liquid possessing a vapor tension sufficient to form with air an ignitable gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture with air at atmospheric temperatures and low pressure in counter-directions while allowing sufficient time to effect the vaporization of said first-named liquid jointly with said another liquid, and regulating the amount of air accordingly.

4. The method of making an air gas from an inflammable volatile liquid possessing a vapor tension insufficient to form with air at atmospheric temperatures and low pressure an ignitable gas, which comprises mixing such volatile inflammable liquid with another volatile inflammable liquid possessing a vapor tension sufficient to form with air an ignitable gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture in a vaporizer with air at atmospheric temperatures and low pressure, regulating the amount of air accordingly and maintaining the temperature of the vaporizer substantially constant.

5. The method of making an air gas from an inflammable volatile liquid possessing a vapor tension insufficient to form with air at atmospheric temperatures and low pressure an ignitable gas, which comprises mixing such volatile inflammable liquid with another volatible inflammable liquid possessing a vapor tension sufficient to form with air an ignitable gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture in a vaporizer with air at atmospheric temperatures and low pressure, regulating the amount of air accordingly, maintaining the temperature of the vaporizer substantially constant, and removing from the vaporizer any unvaporized portion of the liquid mixture.

6. The method of making an air gas from methyl alcohol which possesses a vapor tension insufficient to form with air at atmospheric temperatures and low pressure an ignitable air gas, which comprises mixing with methyl alcohol another volatile inflammable liquid possessing a vapor tension sufficient to form with air at atmospheric temperatures and low pressure an ignitable air gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture with air at atmospheric temperatures and low pressure, and regulating the amount of air accordingly.

7. The method of making an air gas from methyl alcohol which possesses a vapor tension insufficient to form with air at atmospheric temperatures and low pressure an ignitable air gas, which comprises mixing with methyl alcohol another volatile inflammable liquid possessing a vapor tension sufficient to form with air at atmospheric temperatures and low pressure an ignitable air gas containing a deficit in oxygen content for complete combustion in such proportion that the total amount of oxygen contained in the air gas resulting from such mixture is substantially that required for the complete combustion of the combustible constituents of such liquid mixture, vaporizing such liquid mixture with air at atmospheric temperatures and low pressure, regulating the amount of air accordingly, and maintaining such proportion of the air and such liquid mixture independently of the rate of consumption of the resulting air gas.

8. The method of making an air gas from methyl alcohol which possesses a vapor tension insufficient to form with air at atmospheric temperatures and low pressure an ignitable air gas, which comprises mixing with methyl alcohol another volatile inflammable liquid possessing a vapor tension sufficient to form with air at atmospheric temperatures and low pressure an ignitable air gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture with air at atmospheric temperatures and low pressure in counter-directions while allowing sufficient time to effect the vaporization of the methyl alcohol jointly with said another liquid, and regulating the amount of air accordingly.

9. The method of making an air gas from methyl alcohol which possesses a vapor tension insufficient to form with air at atmospheric temperatures and low pressure an ignitable air gas, which comprises mixing with methyl alcohol another volatile inflammable liquid possessing a vapor tension sufficient to form with air at atmospheric temperatures and low pressure an ignitable air gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture in a vaporizer with air at atmospheric temperatures and low pressure, regulating the amount of air accordingly, maintaining the temperature of the vaporizer substantially constant, and removing from the vaporizer any unvaporized portion of the liquid mixture.

10. The method of making an air gas from an inflammable volatile liquid possessing a vapor tension insufficient to form with air at low pressure an ignitable gas, which comprises mixing such volatile inflammable liquid with another volatile inflammable liquid possessing a vapor tension sufficient to form with air an ignitable gas containing a deficit in oxygen content for complete combustion in such proportion that the total amount of oxygen contained in the air gas resulting from such mixture is not greater than required for the complete combustion of the combustible constituents of such liquid mixture, vaporizing such liquid mixture with air at low pressure, and regulating the amount of air accordingly.

In testimony whereof I have signed this specification this 19th day of March, 1925.

HANS FOERSTERLING.